(12) United States Patent
Brodhead

(10) Patent No.: US 7,606,537 B2
(45) Date of Patent: Oct. 20, 2009

(54) SYSTEM AND METHOD FOR TRANSMITTING DATA VIA WAVE REFLECTION

(76) Inventor: Colin Dugald Brodhead, 348 Bunting La., Mankato, MN (US) 56001

( * ) Notice: Subject to any disclaimer, the term of this patent is extended or adjusted under 35 U.S.C. 154(b) by 613 days.

(21) Appl. No.: 10/933,762

(22) Filed: Sep. 3, 2004

(65) Prior Publication Data

US 2005/0176386 A1     Aug. 11, 2005

Related U.S. Application Data

(60) Provisional application No. 60/543,534, filed on Feb. 10, 2004.

(51) Int. Cl.
    H04B 1/69        (2006.01)
(52) U.S. Cl. .................. 455/106; 455/107; 455/130; 455/131
(58) Field of Classification Search .......... 455/91, 455/106–113, 77, 121, 296, 42, 129–13, 455/421, 116, 175.1, 201–210; 340/505, 340/572, 825.54
    See application file for complete search history.

(56) References Cited

U.S. PATENT DOCUMENTS

| | | |
|---|---|---|
| 3,626,316 A | 12/1971 | Connell, Jr. |
| 3,665,103 A | 5/1972 | Watkins |
| 3,862,364 A | 1/1975 | Inose et al. |
| 4,162,371 A | 7/1979 | Belforte |
| 4,583,090 A | 4/1986 | Eden et al. |
| 4,910,791 A | 3/1990 | Dickinson et al. |
| 5,065,451 A | 11/1991 | Leveque |
| 5,253,099 A | 10/1993 | Heidemann |
| 5,313,211 A * | 5/1994 | Tokuda et al. ............... 342/50 |
| 5,579,336 A | 11/1996 | Fitzgerald et al. |
| 5,648,982 A | 7/1997 | Durrant et al. |
| 5,751,770 A | 5/1998 | Tatara |
| 5,826,175 A | 10/1998 | Schmidt et al. |
| 5,862,456 A | 1/1999 | Bode et al. |
| 5,896,452 A | 4/1999 | Yip et al. |
| 6,369,772 B1 | 4/2002 | Forster |
| 6,434,372 B1 | 8/2002 | Neagley et al. |
| 6,456,668 B1 | 9/2002 | MacLellan et al. |
| 6,598,200 B1 | 7/2003 | Greenwood et al. |
| 6,654,565 B2 | 11/2003 | Kenny |
| 2003/0058955 A1 | 3/2003 | Raghavan |
| 2003/0123381 A1 | 7/2003 | Zhuang et al. |
| 2008/0132169 A1* | 6/2008 | Muramatsu ............... 455/41.2 |
| 2008/0274697 A1* | 11/2008 | Ito ............................ 455/42 |

OTHER PUBLICATIONS

A PCT Search Report mailed Nov. 18, 2005 (8 pgs.).

* cited by examiner

*Primary Examiner*—Pablo N Tran
(74) *Attorney, Agent, or Firm*—Dicke, Billig & Czaja, PLLC

(57) ABSTRACT

A system and method of encoding and transmitting data includes a data receiver/carrier transmitter which transmits a sinusoidal carrier signal to a data source/carrier receiver. The data source encodes at least one transmission channel during a corresponding period. The carrier is reflected back to the data receiver with an amplitude proportional to the degree of applied impedance such that the total amplitude of the transmitted and reflected cycles represents encoded data, yet the underlying carrier signal remains an un-modulated sinusoid.

18 Claims, 6 Drawing Sheets

SYSTEM AND METHOD FOR TRANSMITTING DATA VIA WAVE REFLECTION

CROSS-REFERENCE TO RELATED APPLICATIONS

This application claims the benefit of U.S. Provisional Application Ser. No. 60/543,534, filed Feb. 10, 2004 and entitled "System to Transmit Binary and Digitally Encoded Data at Ultra-High Rates by Means of Wave Reflection".

BACKGROUND

The present invention is a system and method for transmitting data. More specifically, the present invention is a system and method for transmitting digital data via a reflective wave signal as the primary means to differentiate a signal into distinctive states.

Conventional logic in system design has always been highly linear. For example, information had to be transmitted as energy. Therefore, the source of information also had to be the source for the energy of the system. This appeared to be the only logical arrangement. Thus, the principal of modulation became the universal technique for virtually every system of communications, and especially essential to every form of modern digital communications.

In the context of this prevailing design philosophy, signal reflection has necessarily been viewed as merely a consequence of bad design, such that if the impedance between a given transmitter and its channel of transmission is mismatched, the signal is obstructed and a portion of its power bounces back upon the source. The result is an effective loss in the energy of transmission, as well as a potentially destructive increasing current flow as the power builds up across the transmitter. Consequently, considerable care has been taken to eliminate the phenomena of reflection from all modern communications and power generating systems.

In addition to this inherent problem, the nature of the modulation process also manifests numerous, self-limiting secondary effects. These include a propensity for inherent signal distortion, the generation of sidebands, a high susceptibility to noise, and a low data rate-to-carrier frequency ratio. With respect to inherent signal distortion, sudden changes in potential are inevitably introduced into a waveform signal. These sudden changes are resisted by the capacitive and inductive elements within every modulation and receiving circuit. This introduces both additional noise and phase shifts within the signal that must be taken into account in order to facilitate proper decoding.

With respect to sidebands, the introduction of sudden changes in potential produces a spectrum of secondary reverberations within modulating circuits. The spectrum of secondary reverberations is the harmonics of the underlying carrier and are known as sidebands. Sidebands ultimately determine the total bandwidth consumed by a basic signal, but also represent a measure of power wasted in unused frequencies. Additionally, sideband spectrums of respective carriers provide a source of mutual interference.

With respect to high susceptibility to noise, sudden changes in signal potential are also inherently similar to simple random noise, thus ultimately making it difficult to distinguish an actual signal from random noise spikes. As is known in the art, numerous sophisticated and coding schemes are applied to compensate for the noise, but naturally incur an increased demand on the available bandwidth. Error detection/correction schemes in conjunction with the production of sidebands provide an appreciable waste in terms of bandwidth and system power.

With respect to low data rate-to-carrier frequency ratio, the width of a pulse must be comprised of many oscillations of the carrier since the carrier oscillation defines the basis for the density of each data pulse. The frequency of the data rate must, by definition, be much lower in frequency than that of the carrier. Coupled with a great susceptibility to error, it is physically impossible for the data rate to ever closely approach, equal, or exceed the oscillatory rate of the carrier.

Therefore, there is a need for a system and method for transmitting data which overcomes the inherent limitations of a conventional modulation system.

SUMMARY

A system and method for transmitting data via a reflective wave signal as the primary means to differentiate a signal into distinctive states. A method of transmitting data includes transmitting at least one cycle of a sinusoidal signal having an amplitude from a carrier transmitter to a carrier receiver. A corresponding at least one cycle of a reflected signal is generated having an amplitude determined by a corresponding data value. The at least one cycle of the reflected signal is transmitted from the carrier receiver to the carrier transmitter. The at least one cycle of the reflected signal is decoded to identify the corresponding data value.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
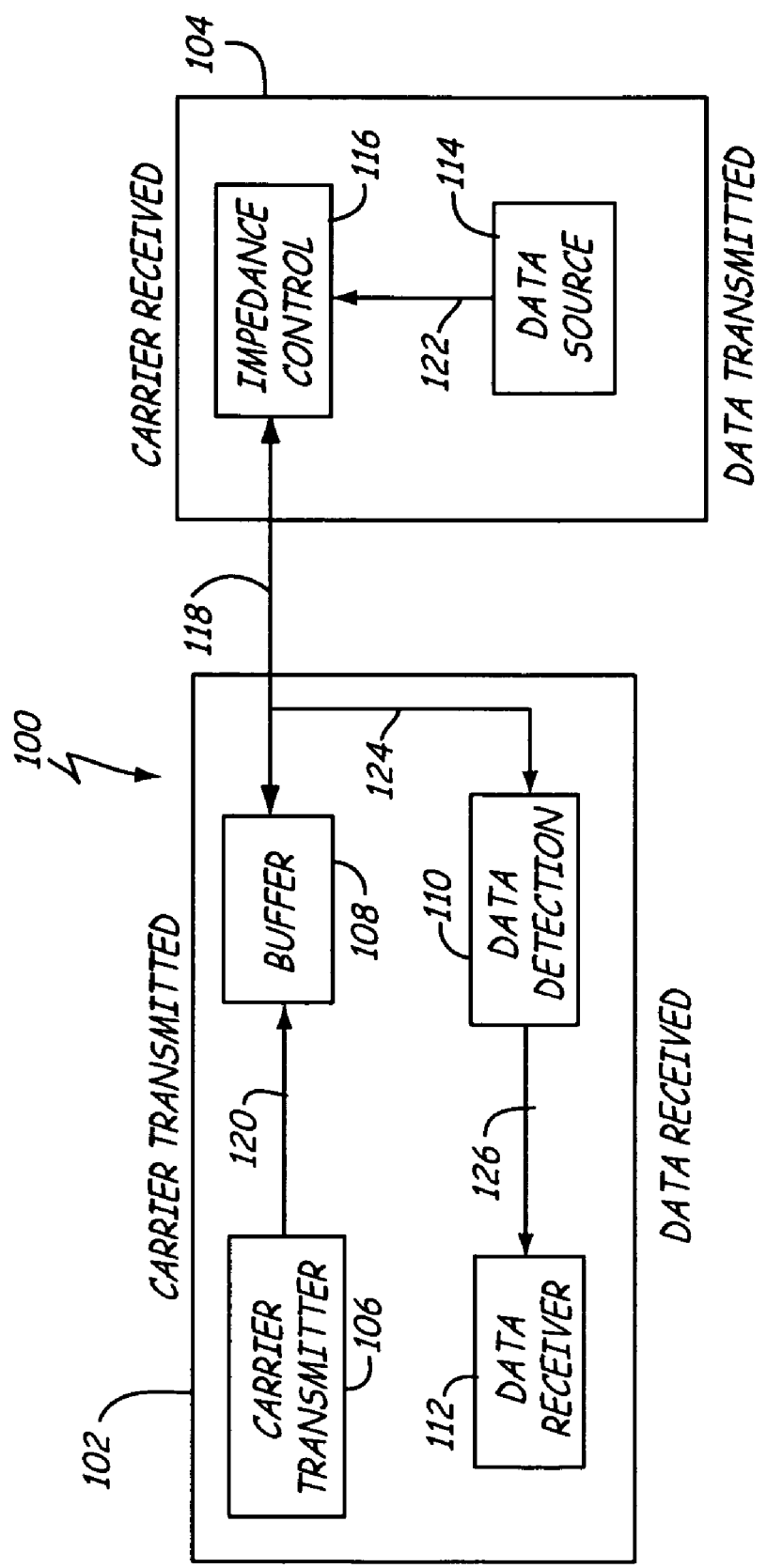
FIG. 1 is an electrical diagram illustrating a data transmission system in accordance with the present invention.
Figure 2:
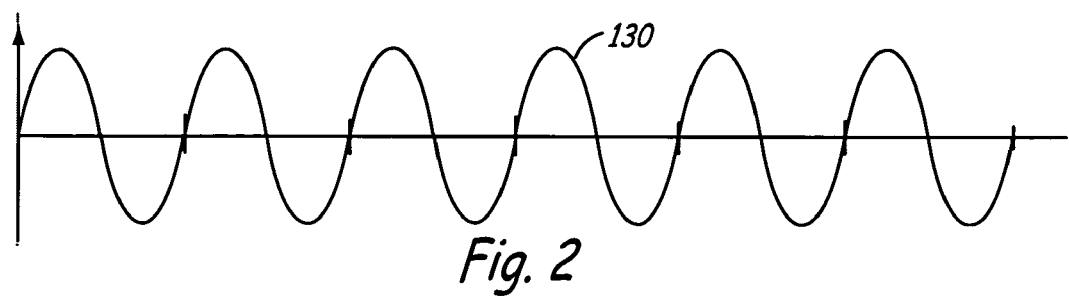
FIG. 2 is a graph illustrating a sinusoidal carrier signal in accordance with the present invention.

As shown in FIG. 1, data transmission system 100 includes carrier signal generator/data signal receiver 102 and carrier signal receiver/data signal generator 104. Further, carrier signal generator/data signal receiver 102 includes carrier transmitter 106, buffer 108, data detection circuitry 110, data receiver circuitry 112, and communication and data lines 120, 124, and 126. Carrier signal receiver/data signal generator 104 further includes data source circuitry 114, impedance control circuitry 116, and communication and data line 122. Bi-directional communication/transmission line 118 electrically couples carrier signal generator/data signal receiver 102 and carrier signal receiver/data signal generator 104.

Data transmission system 100 transmits data, such as digital data, by means of un-modulated sinusoidal carrier signals. In other words, unlike the conventional approach to digital communications, the carrier signal is not mixed with a second signal for the purpose of shaping it into a representative data stream. Rather, data transmission system 100 utilizes the phenomena of a reflective wave as its primary means to differentiate a signal into distinct states, and these reflective waves can be utilized and interpreted as code information. Each cycle of a carrier signal generated by carrier transmitter 106 eventually represents a data value through a process that never actually alters the pure sinusoidal nature of the carrier signal. Each data value represents encoded data or information. In one embodiment, the data value may represent a binary bit of information. In another embodiment, the data value can represent a hexadecimal value. In yet another embodiment, the data value can represent a digital data value.

The approach of the present invention represents a significant advance in performance and efficiency over conventional systems based on the modulation shaping of carrier waves. A distinct advantage of the system and method described herein is in that the system and method allows for the transmission of information at unprecedented data rates, such that they are inherently equal to, and even greater than, the frequency of the carrier signal generated by carrier transmitter 106.

Data transmission system 100 functions in the following manner: carrier transmitter 106 transmits a continuous sinusoidal signal, such as sinusoidal carrier signal 130, through buffer 108 to impedance control circuitry 116 via communication line 120 and bi-directional communication line 118. Buffer 108 can act as a gain stage for the carrier signal. In addition, buffer 108 permits the carrier signal to travel only in the forward direction from carrier transmitter 106 to impedance control circuitry 116, while protecting carrier transmitter 106 from the gain and signal strength of the carrier signal. Once the carrier signal has reached impedance control circuitry 116, the impedance of the bi-directional communication line 118 through which the carrier signal is transmitted is altered in direct response to whichever data value is available for transmission from data source 114 via communication line 122 during any given cycle. In one embodiment, the data value from data source 114 can be a digital data value. In another embodiment, the data value can be a binary data value from data source 114 or a hexadecimal data value. Any other data value may be generated by data source 114 without deviating from the present invention.

In the example of a single binary data bit, a high or low binary output voltage on an output pin of data source 114 acts as a switch control for impedance control circuitry 116 in determining the appropriate impedance mode to be applied to bi-directional communication line 118 for a corresponding reflective wave cycle. The signal may either pass to ground or be entirely reflected. In the example of a multi-bit binary value, the reflective signal may either pass to ground, be entirely reflected, or reflected to any degree between the two extremes based upon the binary data bit at source 114 and the corresponding impedance control circuitry 116.

Figure 3:
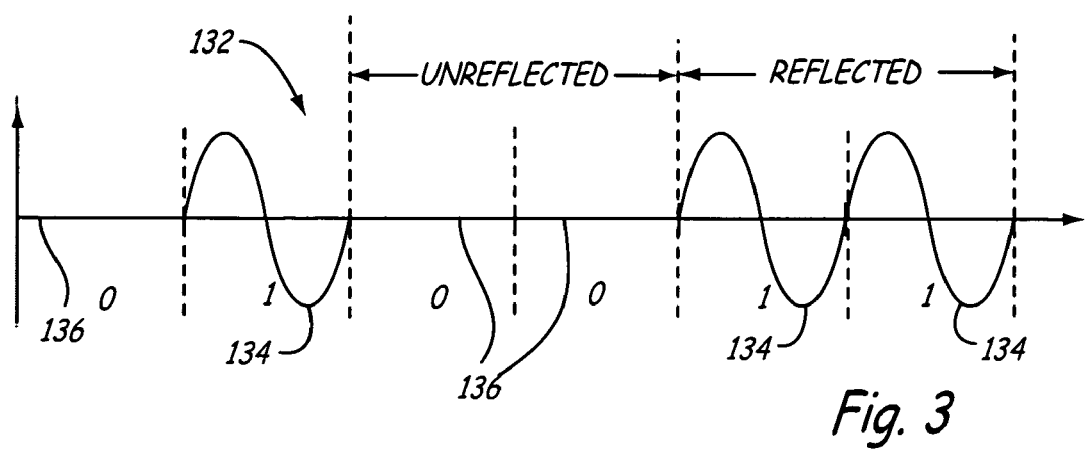
FIG. 3 is a reflected signal in accordance with the present invention.

A reflected signal is provided from carrier signal receiver/data signal generator 104 to carrier signal generator/data signal receiver 102 via bi-directional communication line 118. The reflected signal is detected and monitored by data detection circuitry 110 via communication signal 124 in terms of the signal standing wave characteristics. Reflected wave signal 132, as shown in FIG. 3 is one example of a signal provided to carrier signal generator/data signal receiver 102 from carrier signal receiver/data signal generator 104 based upon a single binary data bit format. In one embodiment, reflected wave cycle 134 of reflected wave signal 132 is equated to a binary 1, while un-reflected waves cycle 136 of reflected wave signal 132 is equated to a binary 0. As shown in FIG. 3, un-reflected wave cycle 136 of reflected wave signal 132 is characterized as a corresponding reduction in amplitude approaching 0. Data detection circuitry 110 decodes the received signal by adjusting the voltage, thus depositing the appropriate value directly onto the input pin of data receiver circuitry 112 via communication line 126. In this manner, an un-modulated signal is differentiated into a representation of distinct data values without any need for modulation in the conventional manner.

Data transmission system 100 can transmit more than one bit of data or information at a time. The amplitude level of reflected wave signal 132 is in direct response and proportional to the applied impedance via impedance control circuitry 116. Therefore, variations in amplitude of reflected wave signal 132 can be used to represent more than simply two states by adopting the technique of assigning data values to a given site of amplitude levels. The amplitude of reflected wave signal 132 is determined by an output pin value of data source 114 acting as a switch control for impedance control circuitry 116.

Figure 4:
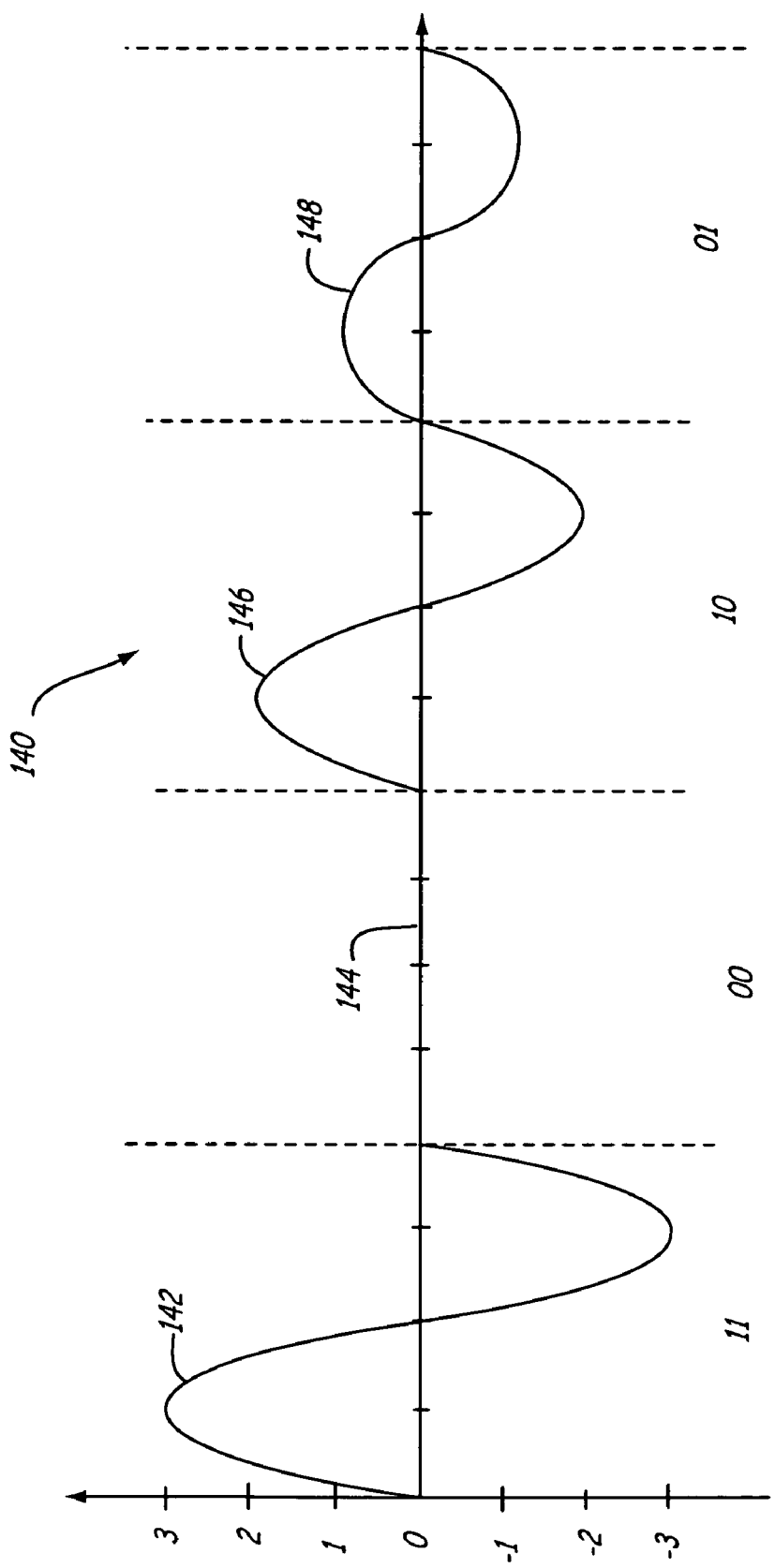
FIG. 4 is another reflected signal in accordance with the present invention.

In one embodiment, data transmission system 100 can utilize a 2-bit encoding scheme by assigning corresponding data values to four distinct amplitude levels of a reflective signal, as shown in FIG. 4. Each distinct amplitude level is in direct response and proportional to the applied impedance via control circuitry 116. The applied impedance is proportional to voltage on an output pin of data source 114 representing a data value ready for transmission.

Reflective wave signal 140 is shown having four distinct wave cycles, each wave cycle having a distinct amplitude level. Reflected wave cycle 142 represents a signal that is entirely reflected, and has an amplitude of $^{+}/-3$. In this embodiment, reflected wave cycle 142 represents binary data value 11. Reflected wave cycle 144 represents a signal that is entirely passed to ground and has no amplitude. In this embodiment, reflected wave cycle 144 represents binary data value 00. Reflected wave cycle 146 is shown partially reflected having an amplitude of $^{+}/-2$ and represents binary data value 10. Reflected wave cycle 148 represents a signal partially reflected having an amplitude of $^{+}/-1$ and represents binary data value 01. It is understood that each binary data value may be assigned to a different reflected wave cycle amplitude without deviating from the present invention. For example, in another embodiment, wave cycle 146 may represent binary data value 01, while reflected wave cycle 148 may represent binary data value 10.

Figure 5:
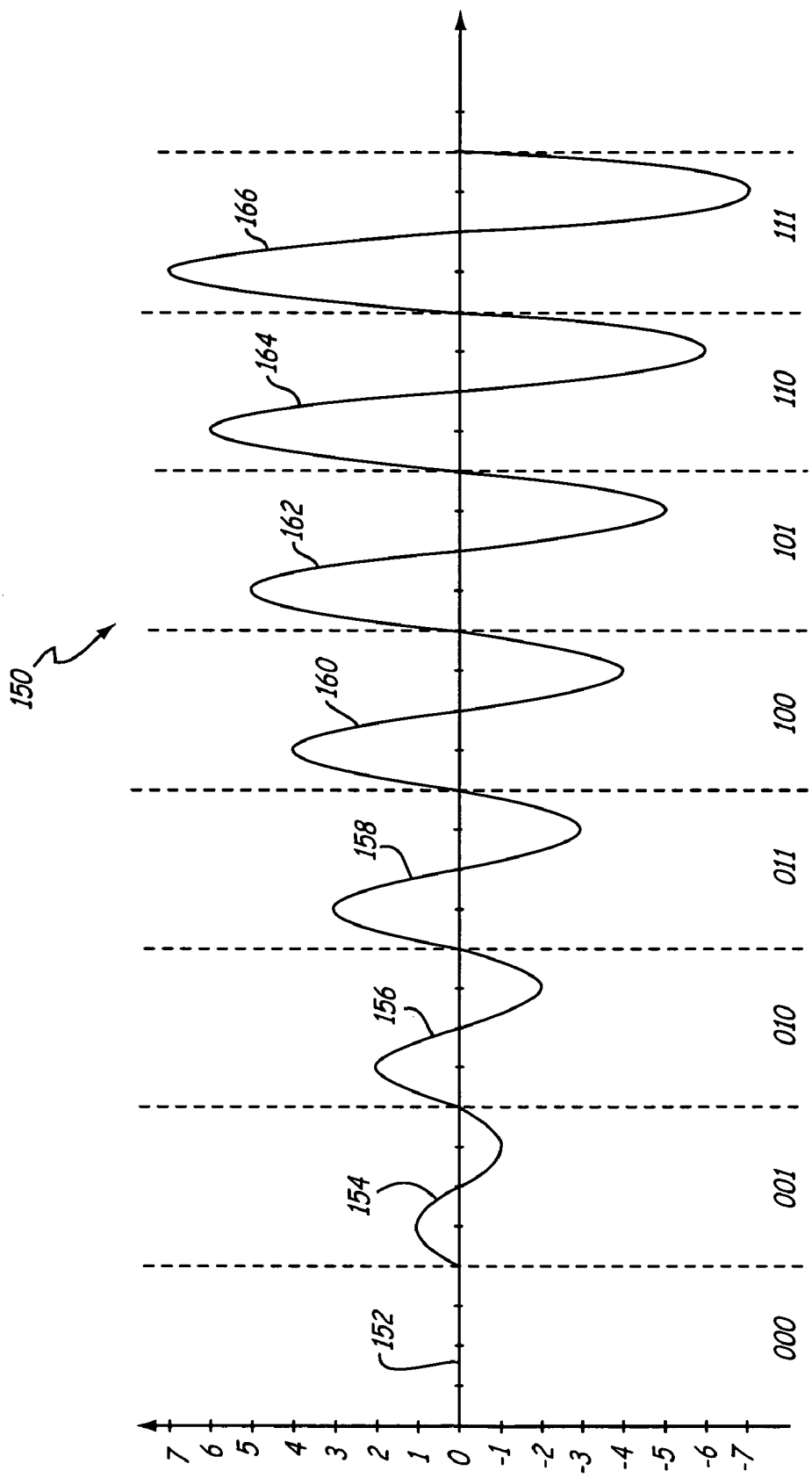
FIG. 5 is yet another reflected signal in accordance with the present invention.

FIG. 5 illustrates reflected wave signal 150, which may be utilized by data transmission system 100 in order to transmit three data bits with each reflected wave cycle of reflected wave signal 150. As shown in FIG. 5, reflected wave cycle 152 represents a reflected signal that has been entirely passed to ground, and therefore has an amplitude of 0, and represents binary data values 000. Reflected wave cycle 154 has an amplitude of ⁺/−1, and represents a binary data value of 001. Reflected wave cycle 156 has an amplitude of ⁺/−2, and represents binary data value of 010. Reflected wave cycle 158 has an amplitude of ⁺/−3, and represents binary data value 011. Similarly, reflected wave cycles 160, 162, 164, and 166 have amplitudes of ⁺/−4, ⁺/−5, ⁺/−6, and ⁺/−7, and represent binary data values 100, 101, 110, and 111, respectively.

It is understood that the binary data values associated with a particular reflected wave cycle may be changed or altered without deviating from the present invention. The illustration shown in FIG. 5 is merely one representation of associating reflected wave cycles with binary data values. Likewise, it is understood that the units of amplitude is irrelevant to the present invention and may be changed to any convenient scheme without deviating from the present invention. It is further understood that while FIGS. 2-5 are shown using a binary data system, data transmission system 100 can be utilized with any of a variety of data systems, including such systems as a hexadecimal data system. Similarly, while data transmission system 100 has been illustrated as a digital data system, it is understood that other types of data can be encoded and transmitted through use of data transmission system 100.

As shown in FIG. 5, each reflected wave cycle represents three data bits. As a result, and for example, a 1-megahertz carrier signal can then represent a data transmission in excess of 2.9-megabytes of information per second. Therefore, the data rate of data transmission system 100 can actually exceed the frequency of the carrier signal. Even greater data transmission rates are possible through use of two specific techniques. First, amplitude-encoding schemes utilizing 16 or 32 levels can result in effective data rates that are four- and five-times the frequency of the carrier signal, respectively, and so on.

Second, by utilizing an array of simultaneous carrier signals, even greater data rates are possible. For example, in the case in which data is transmitted in terms of bytes-per-cycle, eight separate carrier signals may be assigned a corresponding base-2 value in ascending order. The lowest frequency, F1, can be assigned a value of $2^0$. The next highest frequency, F2, can be assigned the value of $2^1$, and so on. At the end of this sequence, each cycle of the highest carrier frequency will represent a binary position value of $2^7$. In like manner, each wave of each carrier becomes a data value 1 or a data value 0, rated with a pre-assigned base-2. Each carrier signal can be filtered from all other carrier signals and reflected or not during a cycle whose period coincides with the wavelength of the lowest carrier frequency. Using the system described, information is presented at the rate of one entire byte during any given cycle. The bit rate for an 8-carrier system utilizing, for example, 1-megahertz as the lowest carrier frequency will, under ideal conditions, transmit data at a rate of eight million bits, or approximately 7.8-megabytes of information per second.

In addition, each carrier signal may also be simultaneously amplitude-encoded as previously described. Therefore, if a 3-bit encoding scheme is applied in conjunction with an 8-carrier transmission array, the same array can attain a minimum of twenty-four million bits, or approximately 23.4-megabytes of information per second. Increasing the number of discretely recognized levels of amplitude can be utilized to encode a greater number of equivalent bits, just as higher frequencies would generate inherently greater data rates.

Figure 6:
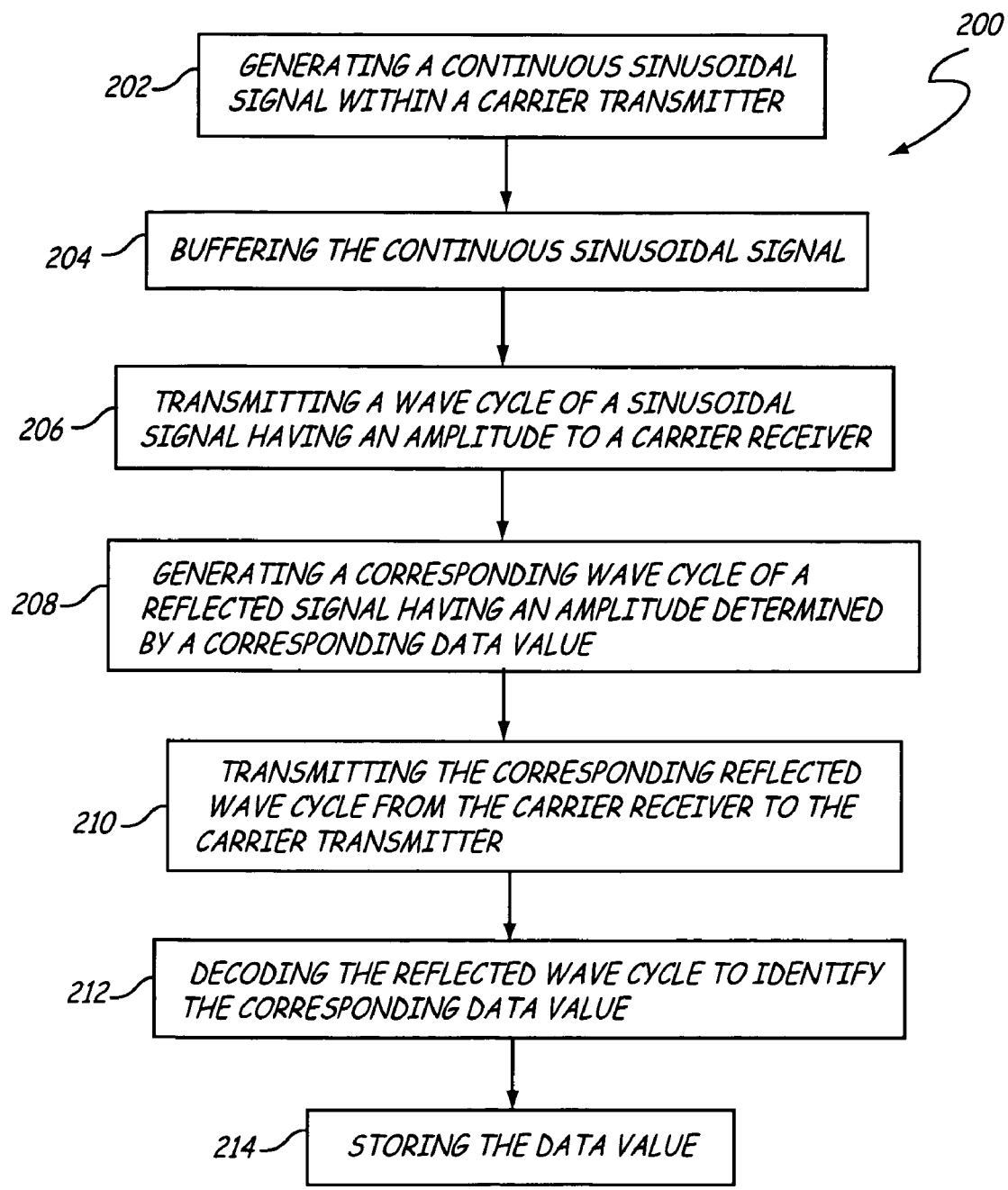
FIG. 6 is a flow chart illustrating one embodiment of a data transmission method in accordance with the present invention.

FIG. 6 is a flow chart illustrating data transmission method 200. At step 202, a continuous sinusoidal signal is generated within carrier transmitter 106 of carrier signal generator/data signal receiver 102 (as shown in FIG. 1). At step 204, the continuous sinusoidal signal is buffered by buffer 108. Buffer 108 permits the continuous sinusoidal signal to be transmitted in only a forward direction, and also acts as a gain stage for the sinusoidal signal. At step 206, a wave cycle of the sinusoidal signal having an amplitude is transmitted from carrier signal generator/data signal receiver 102 to carrier signal receiver/data signal generator 104. At step 208, a corresponding wave cycle of a reflected signal having an amplitude determined by a corresponding data value is generated. In one embodiment, impedance control circuitry 116 alters an impedance through which the sinusoidal signal is transmitted in direct response to and proportional to voltage on an output pin of data source 114 representing a data value ready for transmission. At step 210, the corresponding reflected wave cycle is transmitted from carrier signal receiver/data signal generator 104 to carrier signal generator/data signal receiver 102. At step 212, the reflected wave cycle is decoded to identify the corresponding data value. In one embodiment, decoding step 212 includes determining the amplitude of the corresponding reflected signal cycle and identifying the data value associated with the determined amplitude of the corresponding reflected signal cycle. At step 214, the data value is stored within a memory component. It is understood that the data can represent digital or non-digital information, and can represent binary data, hexadecimal data, or any other types of data.

Figure 7:
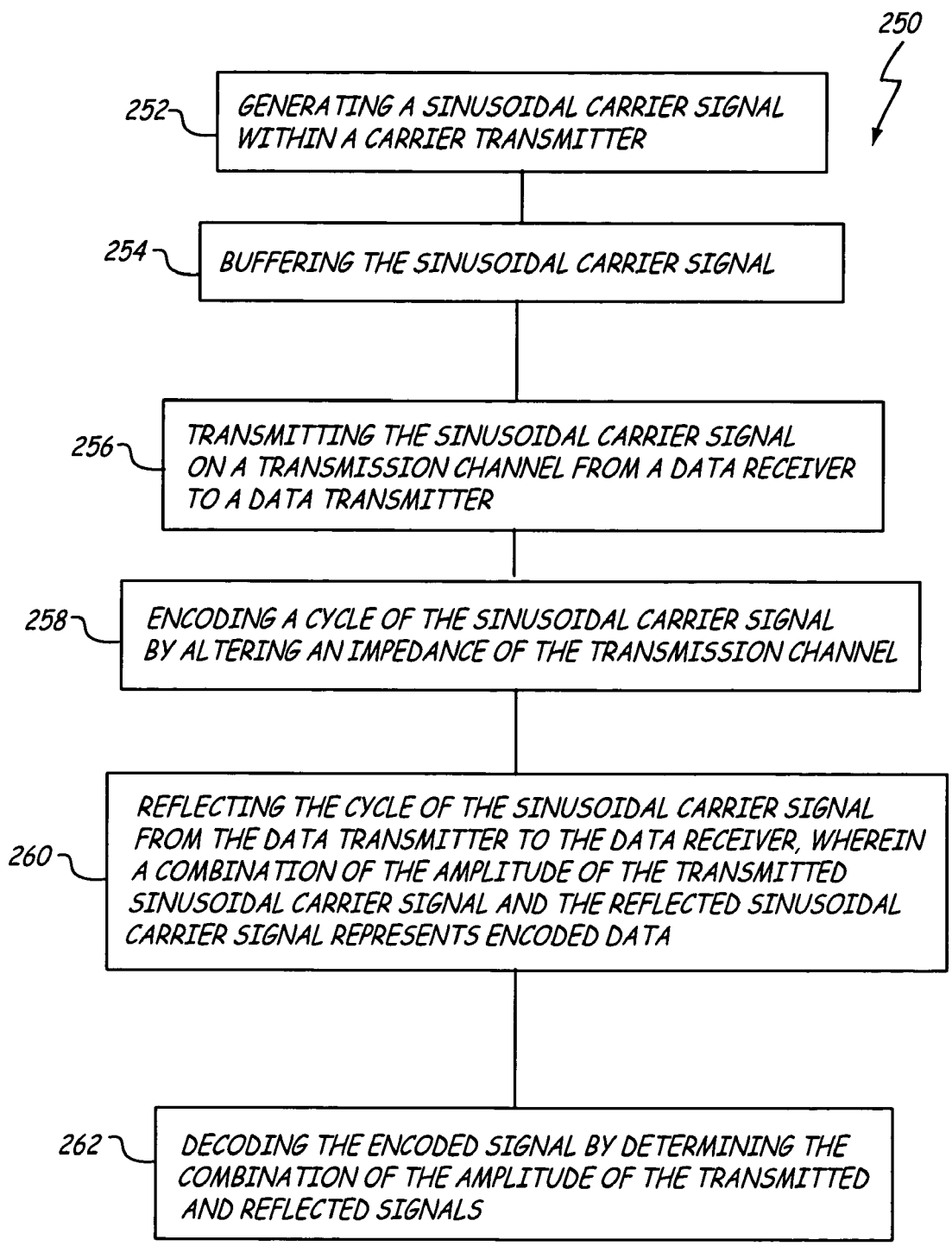
FIG. 7 is a flow chart illustrating another embodiment of a data transmission method in accordance with the present invention.

FIG. 7 is a flow chart illustrating another data transmission method 250 in accordance with the present invention. At step 252, a sinusoidal carrier signal is generated within carrier signal generator/data signal receiver 102. At step 254, the sinusoidal carrier signal is buffered. At step 256, the sinusoidal carrier signal is transmitted on a transmission channel from carrier signal generator/data signal receiver 102 to carrier signal receiver/data signal generator 104. At step 258, a cycle of the sinusoidal carrier signal is encoded by altering an impedance of the transmission channel in direct response to and proportional to voltage on an output pin of data source 114 representing a data value ready for transmission. At step 260, the encoded cycle of the sinusoidal carrier signal is reflected from carrier signal receiver/data signal generator 104 to carrier signal generator/data signal receiver 102. A combination of the amplitude of the transmitted sinusoidal carrier signal and the reflected sinusoidal signal represents encoded data. At step 262, the encoded signal is decoded by determining the combination of the amplitude of the transmitted and reflected signals. It is understood that the data can represent digital or non-digital information, and can represent binary data, hexadecimal data, or any other types of data.

The present invention shown and described herein is a system and method to transmit digital data by means of unmodulated sinusoidal signals utilizing reflected waves as its primary means to differentiate this signal into distinct states, which can be utilized and interpreted as coded information. With the system and method of the present invention, all cycles of a carrier signal can represent one or more data values of information through a process that never actually alters the pure sinusoidal nature of the signal. The system and method of the present invention permits the transmission of information at unprecedented bit rates, such that the transmission of information is inherently equal to, and even greater than, the frequency of the carrier signal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transmitting data, the method comprising:
   transmitting a sinusoidal signal as a purely sinusoidal wave having an amplitude from a carrier transmitter to an impedance control stage of a carrier receiver;
   producing a reflected signal within the carrier receiver in response to a combination of the sinusoidal signal and an impedance value representative of a data value available for transmission, wherein the reflected signal is a sinusoidal wave;
   transmitting the reflected signal to the carrier transmitter; and
   decoding the reflected signal to identify the data value.

2. The method of claim 1, and further comprising:
   storing the data value in a memory component.

3. The method of claim 1, and further comprising:
   generating a continuous sinusoidal signal within the carrier transmitter; and
   passing the continuous sinusoidal signal through a buffer such that the signal can only travel in a forward direction.

4. The method of claim 1, wherein providing a reflected signal with the carrier receiver further comprises:
   altering an impedance of circuitry through which the sinusoidal signal is transmitted in producing the reflected signal based upon the data value.

5. The method of claim 1, wherein producing a reflected signal further comprises:
   producing the reflected signal having an amplitude determined by a combination of an amplitude of the sinusoidal signal and the impedance value representative of the data value.

6. The method of claim 1, wherein decoding the reflected signal further comprises:
   determining an amplitude of the reflected signal; and
   identifying the data value associated with the determined amplitude of the reflected signal.

7. The method of claim 1, wherein producing a reflected signal further comprises:
   producing the reflected signal in response to the combination of the sinusoidal signal and an impedance value representative of a digital data valve.

8. The method of claim 1, wherein producing a reflected signal further comprises:
   producing the reflected signal in response to the combination of the sinusoidal signal and an impedance vale representative of a binary data value consisting of at least one data bit.

9. The method of claim 1, wherein producing a reflected signal further comprises:
   producing the reflected signal in response to the combination of the sinusoidal signal and an impedance value representative of a hexadecimal data value.

10. A method of transmitting data, the method comprising:
    transmitting a sinusoidal carrier signal having an amplitude on a transmission channel from a data receiver to a data transmitter;
    encoding at least one cycle of the sinusoidal carrier signal by altering an impedance of the transmission channel during a corresponding cycle; and
    reflecting the at least one cycle of the sinusoidal carrier signal from the data transmitter to the data receiver as a sinusoidal wave having an amplitude proportional to a degree of the altered impedance, such that a combination of the amplitude of the transmitted sinusoidal carrier signal and the reflected sinusoidal carrier signal represents encoded data.

11. The method of claim 10, and further comprising:
    determining the combination of the amplitude of the transmitted sinusoidal carrier signal and the reflected sinusoidal carrier signal, thereby decoding the encoded signal.

12. The method of claim 10, wherein encoding the at least one cycle of the sinusoidal carrier signal further comprises:
    generating the encoded at least one cycle of the sinusoidal carrier signal having the amplitude determined by a corresponding digital value.

13. The method of claim 12, wherein encoding the at least one cycle of the sinusoidal carrier signal further comprises:
    generating the encoded at least one cycle of the sinusoidal carrier signal having the amplitude determined by a corresponding binary value.

14. The method of claim 12, wherein encoding the at least one cycle of the sinusoidal carrier signal further comprises:
    generating the encoded at least one cycle of the sinusoidal carrier signal having the amplitude determined by a corresponding hexadecimal value.

15. The method of claim 10, wherein transmitting a sinusoidal carrier signal includes transmitting a continuous sinusoidal wave.

16. The method of claim 10, wherein the sinusoidal carrier signal is an un-modulated sinusoidal carrier signal.

17. The method of claim 10, wherein the sinusoidal carrier signal is a continuously oscillating waveform.

18. The method of claim 10, wherein the reflected sinusoidal carrier signal is a standing wave.

* * * * *